(12) United States Patent  (10) Patent No.: US 6,517,431 B2
Schwersmann  (45) Date of Patent: Feb. 11, 2003

(54) COMBINE HARVESTER HAVING A TRANSFER ZONE WITH SIDE PANELS

(75) Inventor: Berthold Schwersmann, Bad Iburg (DE)

(73) Assignee: Claas Selbstfahrende Erntemaschinen GmbH, Harsewinkel (DE)

(*) Notice: Subject to any disclaimer, the term of this patent is extended or adjusted under 35 U.S.C. 154(b) by 0 days.

(21) Appl. No.: 09/838,771

(22) Filed: Apr. 19, 2001

(65) Prior Publication Data

US 2001/0054279 A1 Dec. 27, 2001

(30) Foreign Application Priority Data

Apr. 19, 2000 (DE) .......................................... 100 19 667

(51) Int. Cl.⁷ ............................. A01F 12/00; B02B 7/02
(52) U.S. Cl. ................................ 460/16; 460/66; 460/69
(58) Field of Search ............................... 460/67, 69, 80, 460/16, 70, 66, 68, 77, 113, 119

(56) References Cited

U.S. PATENT DOCUMENTS

| | | | |
|---|---|---|---|
| 3,626,472 A | * 12/1971 | Rowland-Hill | 460/70 |
| 3,827,443 A | * 8/1974 | Drayer | 460/16 |
| 3,828,794 A | * 8/1974 | Gochanour et al. | 460/68 |
| 3,994,303 A | * 11/1976 | Rowland-Hill | 460/70 |
| 3,994,304 A | * 11/1976 | Todd et al. | 460/70 |
| 4,291,709 A | * 9/1981 | Weber et al. | 460/70 |
| 4,875,890 A | * 10/1989 | Margerum et al. | 460/68 |
| 4,986,794 A | * 1/1991 | Ricketts | 460/67 |
| 5,078,646 A | * 1/1992 | Class et al. | 460/69 |
| 5,145,462 A | * 9/1992 | Tanis et al. | 460/68 |
| 5,556,337 A | * 9/1996 | Tophinke et al. | 460/70 |
| 6,129,629 A | * 10/2000 | Dammann et al. | 460/67 |

FOREIGN PATENT DOCUMENTS

| | | | |
|---|---|---|---|
| EP | 0 591 688 B1 | 10/1996 | |
| WO | 98/53662 | * 12/1998 | A01F/7/06 |

* cited by examiner

Primary Examiner—Robert E. Pezzuto
Assistant Examiner—Árpád F. Kovács
(74) Attorney, Agent, or Firm—Husch & Eppenberger, LLC; Robert E. Muir; David A. Chambers (57) ABSTRACT

A self-propelled combine harvester includes a transfer zone with side panels and a meshing and feed drum which functions on the tangential flow principle. The feed drum feeds the harvested crop to the separating rotors, which function on the axial flow principle and are rotatably mounted in rotor housings. Side panels are operatively mounted on the rotor housing in the frontal pickup region thereof Guide rails are directed upwardly at an acute angle and become increasingly elevated in the direction of conveyance, for imparting an upward, axially directed pulse to the harvested crop whereby the increasing elevation amplifies this pulse without thereby blocking the pickup zone in a frontal region. Dividing wedge for dividing the harvested crop into two paths, wherein the harvested crop glides over the dividing wedge towards the rotor housings and the long stemmed materials, such as stalks, are caught by the separating rotors and drawn into the corresponding rotor housing via the dividing wedge.

22 Claims, 6 Drawing Sheets

COMBINE HARVESTER HAVING A TRANSFER ZONE WITH SIDE PANELS

TECHNICAL FIELD OF THE INVENTION

The invention relates to harvesting equipment, and more specifically to a self-propelled combine harvester having devices for improving the flow of harvested crop from feed drum to separating rotors.

BACKGROUND OF THE INVENTION

Self-propelled combine harvesters have a ground drive assembly, a frame, and working implements for picking up, conveying, processing and expelling crop, and drive devices for driving at least one meshing or feed drum, which functions on the tangential flow principle, and two separating rotors, which function on the axial flow principle and are rotatably mounted within rotor housings. Conveying implements are mounted on the separating rotors. A rotor core of the separating rotor has a substantially cylindrical shape on the outer contour where the conveying implements are mounted. The rotor core tapers from narrow to wide in the direction away from the feed drum.

EP 0 591 688 B1 describes a self-propelled combine harvester having a transfer zone design that does not optimally transfer crop from the feed drum to the separating rotor during various harvesting conditions, such as high throughput conditions. Because the harvested crop is conveyed in a radial direction from the feed drum to the separating rotors of the rotor housings, where the harvested crop is moved in an axial direction, the harvested crop may not be received by the separating rotors in an optimal manner under unfavorable harvesting conditions.

There are various types of self-propelled combine harvesters. There are purely axial-type combine harvesters, which thresh and separate the harvested crop by separating rotors mounted in rotor housings. Other self-propelled combine harvesters add a feed drum, which functions on the tangential flow principle, prior to the rotor housings so as to ensure that the harvested crop is properly transferred from the feed rake to the rotor housings. The feed drum is used for advancing and/or threshing harvested crop. There are self-propelled combine harvesters which take the crop from the feed rake, thresh it in a threshing device, which functions on the tangential flow principle, and then use the separating rotors in the rotor housings exclusively for separating the grain from the straw. A problem common to all these self-propelled combine harvesters is the conveying of harvested crop in varying harvest conditions. With respect to the two adjacent separating rotors design, it is especially difficult to divide the harvested crop flow without causing blockages.

The present invention is directed to overcoming one or more of the problems set forth above.

SUMMARY OF THE INVENTION

An aspect of the invention is to provide a self-propelled combine harvester with an improved design to facilitate the transfer of harvested crop from a feed drum to separating rotors of rotor housings.

Another aspect of this invention is to provide a self-propelled combine harvester having side panels to improve the transfer of harvested crop from a feed drum to the separating rotors of the rotor housings.

In still another aspect of this invention there is provided a self-propelled combine harvester having a pickup zone to facilitate the transfer of harvested crop into the separating rotors of the rotor housings.

In still another aspect of this invention there is provided a self-propelled combine harvester having guide rails, which are directed upwardly at an acute angle and become increasingly elevated in the direction of conveyance, for imparting an upward, axially directed pulse to the harvested crop whereby the increasing elevation amplifies this pulse without thereby blocking the pickup zone in a frontal region.

In still yet another aspect of the invention there is provided a self-propelled combine harvester having a longitudinally disposed dividing wedge for dividing the harvested crop into two paths, wherein the harvested crop glides over the dividing wedge towards the rotor housings and the long stemmed materials, such as stalks, are caught by the separating rotors and drawn into the corresponding rotor housing via the dividing wedge.

Still another aspect of the invention there is provided a self-propelled combine harvester having a feed drum with a height relative to a height of separating rotors such that the feed drum transfers harvested crop with only a minimum amount of upward and downward scatter.

The above aspects are merely illustrative examples of a few of the innumerable aspects associated with the present invention and should not be deemed an all-inclusive listing in any manner whatsoever.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION

Figure 1:
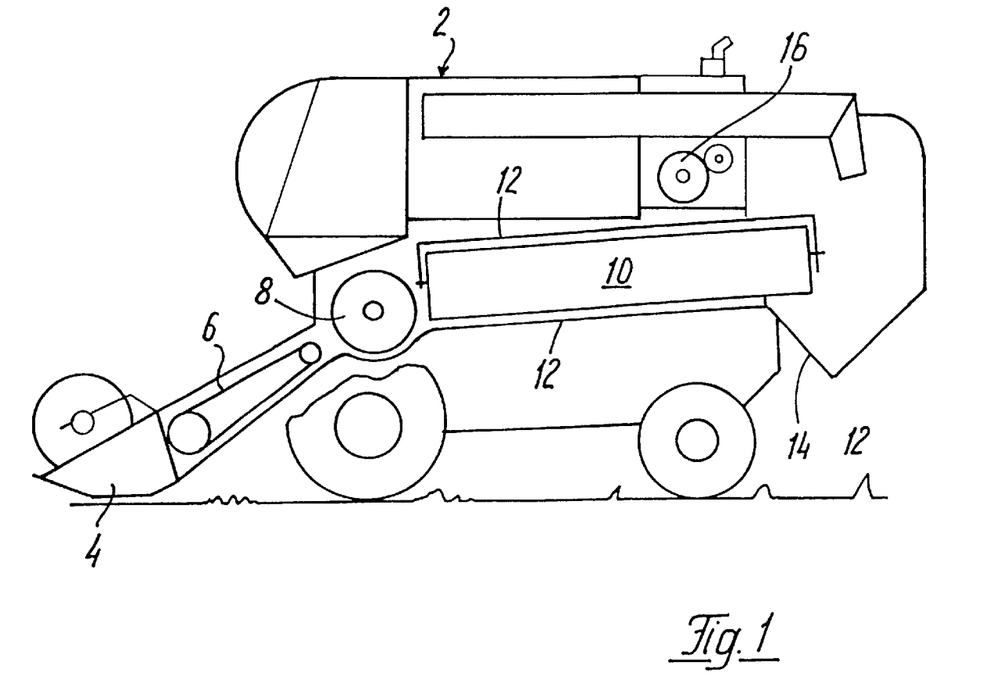
FIG. 1 is a side view of a self-propelled combine harvester.

Referring now to FIG. 1, which illustrates a self-propelled combine harvester 2 having a ground drive assembly, a frame, a cutter bar 4 and a feed rake 6 for picking up the harvested crop and conveying it to a threshing or feed drum 8. The feed drum 8 transfers the harvested crop to separating rotors 10, which are rotatably mounted in rotor housings 12. An unloading chute 14 receives the harvested crop from the rotor housings 12 and processes and expels the harvested crop. A motor 16 drives the self-propelled combine harvester and its working parts, such as the feed drum 8 and separating rotors 10. The feed drum 8 is arranged in front of the openings to the rotor housings 12. As the feed drum 8 transfers harvested crop to the rotor housings 12, the separating rotors 10 separate and thresh the different fractions of the harvested crop.

Figure 2:
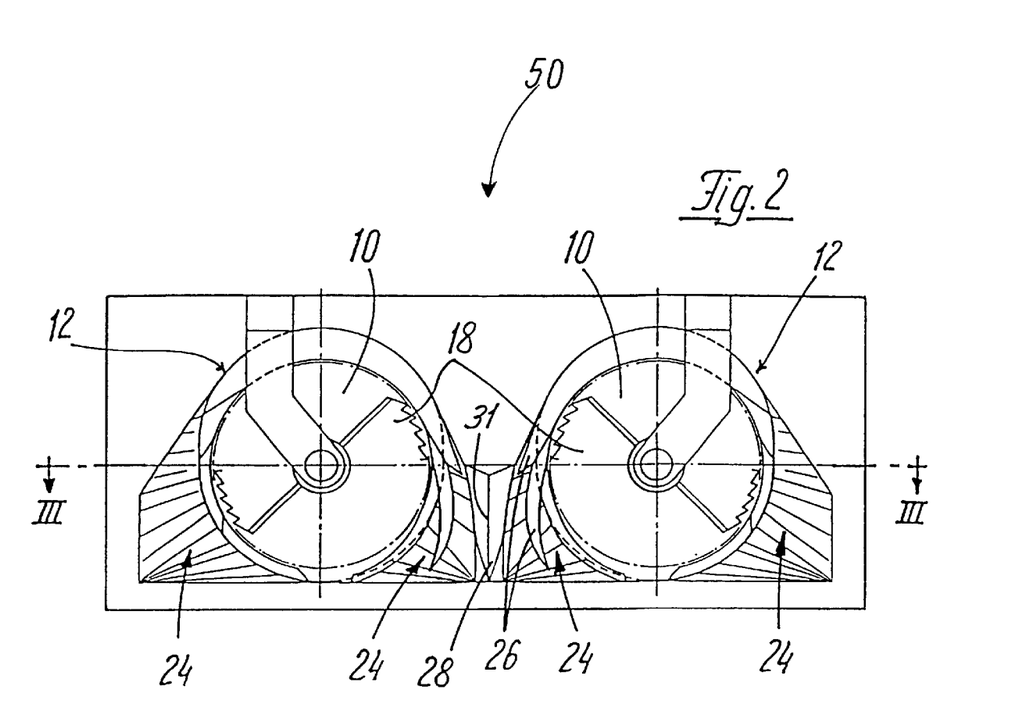
FIG. 2 is a front view of a transfer zone.
Figure 3:
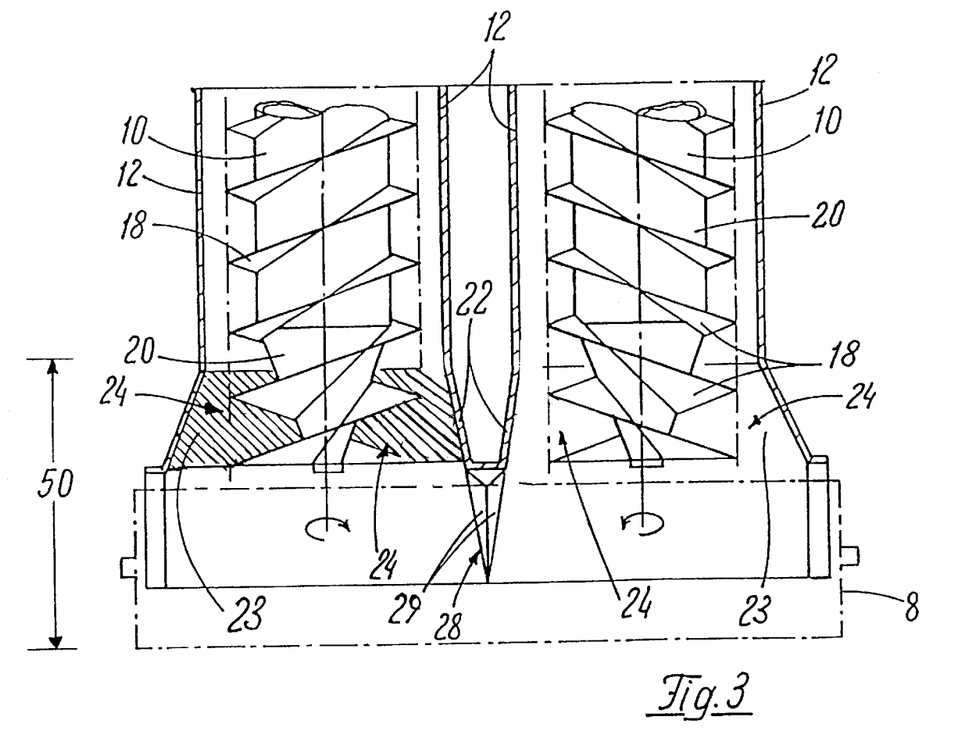
FIGS. 3 and 3a are a cross-section of the transfer zone along the line III—III in FIG. 2.

Referring now to FIGS. 2 and 3, which illustrate a transfer zone 50. The entire width of a pickup zone 24 receives the harvested crop being fed to the rotor housings 12 below section line III—III without any immediate need to alter the direction thereof. The pickup zone 24 is disposed laterally of and below the separating rotors 10 perceptible from the dashed tilt-lines shown in the transfer zone 50. The surface of the transfer zone 50 can be smoothly rounded. Guide rails 26 in the transfer zone 50 are curved and are wider from the outermost corner points, both backwardly and inwardly, towards the opening in the rotor housings 12.

Referring now to FIG. 3, which illustrates a cross section of the transfer zone 50. The feed drum 8 is shown by phantom lines in front of openings of the rotor housings 12 and the separating rotors 10 mounted therein. The feed drum 8 advances the harvested crop in such a manner that it will undershoot into the effective regions of the separating rotors 10 having conveying implements 18. The separating rotors 10 have a rotor core 20. The rotor core 20 is tube-like and operatively connected to the conveyor implements 18. The conveyor implements 18 are in the form of auger blades. The rotor core 20 tapers conically at its frontal end or tapers from narrow to wide in the direction away from the feed drums 8. As the rotor core 20 varies in diameter or width, the conveying implements 18 vary. For example as the rotor core 20 diameter or width decreases, the conveying implements 18 increase or are longer such that the distance from the center of the rotor core 20 to the end of the conveying implements 18 are substantially consistent for the length of the separating rotors 10.

Referring again to FIG. 3, which illustrates side panels 22, which are operatively connected to a front portion of the rotor housings 12. The side panels 22 are horizontal and converge toward the separating rotors 10 such that in comparison with the rotor core 20, a pickup zone 24 will become narrower. The pickup zone 24 narrows to facilitate the transfer of harvested crop to the conveying implements 18. The side panels 22 direct the harvested crop towards the rotor housings 12. Because the side panels 22 narrow the pickup zone 24, the transfer of the harvested crop to the rotor housings 12 is improved. The side panels 22 of the rotor housings 12 converge; however, only one of the side panels 22 needs to converge. The amount of the convergence is dependent on the width of the feed drum 8, the diameters of the separating rotors 10 and the distance between the separating rotors 10 and the rotor housings 12, and the diameter of the rotor housing 12 that can be derived therefrom. The angle of convergence for the side panels 22 is dependent on the depth of the pickup zone 24. Because the amount or angle of convergence of the side panels 22 is adjustable according to factors such as the width of the feed drum 8 and the sum of the widths of the rotor housings 12, the optimal angle of convergence of the side panels 22 for various set-ups or designs varies based on these factors and can be easily determined.

Figure 4:
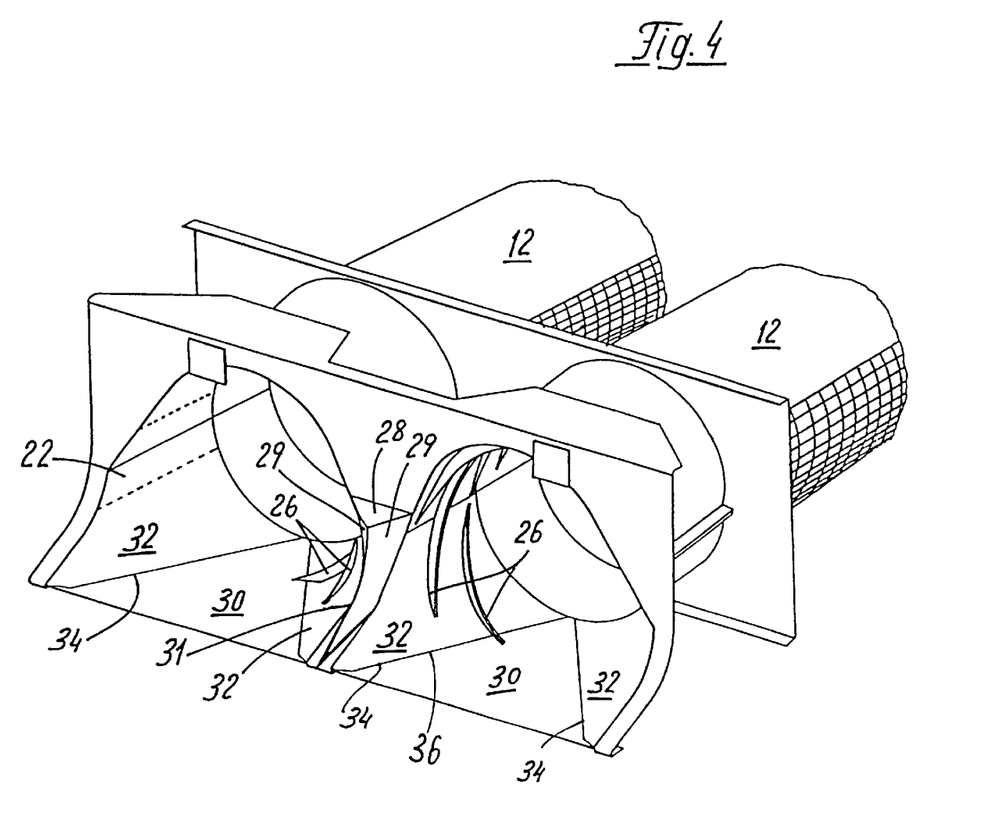
FIG. 4 is a perspective view of the transfer housings without rotors.

Referring now to FIGS. 3 and 4, which illustrates the transfer zone 50 approximately at the height of rotational axes of the separating rotors 10. A lower cross section would show that the geometries of the side panels 22 are appropriately matched to the smaller rotor housings 12 diameter at that point. If the side panels 22 of the rotor housings 12 are formed from a single piece of sheet metal, the side panels 22 would naturally signify just those parts of the sheet metal, which are located horizontally and laterally of the rotational axis of the separating rotor 10, and the remainder of the metal sheet would pass downwardly into the transition surface 32 and a base member 23. By connecting the base member 23 to the two side panels 22 of the rotor housing 12 in a triangular or trapezoidal shape, the transfer of harvested crop is improved. The base member 23 is arranged forwardly and becomes narrower towards the conveying implements 18. For the areas where the transition surface 32 is lateral and abuts a flat surface 30 along seams 34 and which are curved or angled upwardly towards their termination along the lower edges of the respective side panels 22 and broader in the direction of conveyance, the seams 34 between the flat surface 30 and the transition surfaces 32 are located outside a curve which is concentric relative to the separating rotors 10 and form an inner tangent to the transition surface 32 because a kink angle 36 is formed between the flat surface 30 and the transition surface 32 along the seams 34. The harvested crop is advanced via the feed drum 8 to the pickup zone 24 formed by the base member 23, the side panels 22, the flat surface 30, the transition surface 32 and the seams 34. Alternatively, the capacity of such an arrangement is increased if the base member 23 is commenced or begins below the feed drum 8 and extends up to the frontal edge of the rotor housings 12, which has a rectangular geometry. The pickup zone 24 is formed in the horizontal plane between the side panels 22 and the oppositely located casing of the conical rotor core 20. The pickup zone 24 is indicated by the hatching illustrated in FIG. 2. Approximately one half of the pickup zone 24 is penetrated or swept by the conveying implement 18, and the other half of the pickup zone 24 form regions not penetrated or swept by the conveying implement 18. Optionally, the pickup zone 24 is able to be located in three other positions. The regions of the pickup zone 24, as shown in FIG. 3, not penetrated or swept by the conveying implement 18, which allow the harvested crop to enter and then move laterally therefrom into a region B, as is indicated by the arrow, that is penetrated or swept by the conveying implement 18.

The pickup zone 24 is parallel and close to the feed drum 8 so that the harvested crop is easily fed from the feed drum 8 to the separating rotors 10 without stopping or blocking. Whereas prior to the new pickup zone 24 design disclosed herein, the harvested crop being fed from the feed drum 8 would stop due to coming into contact with the auger blades or conveyor implements 18.

However, the pickup zone 24 permits the harvested crop to be conveyed into an area laterally adjacent to the separating rotor 10 without slowing down. The laterally located areas of the pickup zone 24 permit the harvested crop to be conveyed into the areas that are laterally adjacent to the separating rotors 10 without slowing the harvested crop flow. The lateral widening of the rotor housings 12 permit the pickup zone 24 to extend over substantially the full width of the feed drum 8. The pickup zone 24 is significantly larger than the sum of the diameters of the rotor housings 12. Energy loss from the harvested crop slowing or stopping during the transfer from the feed drum 8 to the rotor housings 12 is substantially reduced by the pickup zone 24. Transverse movement of the harvested crop is reduced to a minimum. The convergence or narrowing of the pickup zone 24 towards the separating rotors 10 increase the forces acting on the harvested crop thereby moving the harvested crop laterally into the effective region of the conveying implements 18 ensuring positive forwarding of the harvested crop. Alternatively, the separating rotors 10 can be modified laterally in this manner. The regions of the pickup zone 24 are very capacious to balance out variations in the quantity of incoming harvested crop without causing blockages.

Figure 3A:
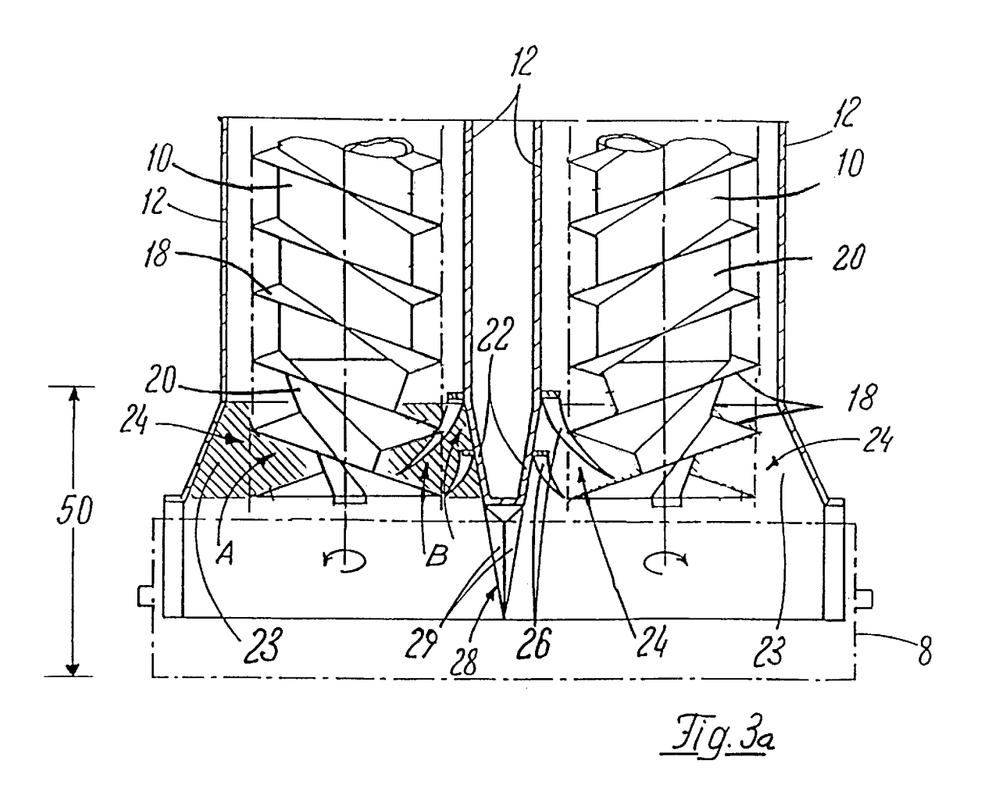

Referring now to FIG. 3a, guide rails 26 are operatively mounted on inner surfaces of the side panels 22. The conveying implements 18 of the separating rotors 10 are rotated upwardly causing the harvested crop to interact with the guide rails 26 at a steep angle. The guide rails 26 have slender tips and are increasingly elevated away therefrom. The guide rails 26 are located where the conveying implements 18 are moving upwardly in the rotor housing 12, i.e.

in the direction of the arrows shown in FIG. 3a. The harvested crop is advanced via the conveying implements 18 thereby pressing the harvested crop against the guide rails 26. The straw is inclined to resist such advancement because of the upward direction and also a displacement in the axial direction. The guide rails 26 impart an upward, axially directed pulse to the harvested crop whereby the increasing elevation amplifies this pulse without thereby blocking the pickup zone 24. The arrangement of such passive elements on the corresponding side panels 22 are important because, otherwise, a corresponding upwardly directed axial pulse would not be produced in this area due to the fact that the conveying implements 18 cannot work effectively in this area. As indicated by the arrow B, the harvested crop is urged upwardly by the guide rails 26 so as to enter into the effective conveyance region of the conveying implements 18. The guide rails 26 are dispensed with in those areas where the separating rotors 10 are forcing the crop downwardly as shown by arrow A.

Referring again to FIG. 3, the guide rails 26 are not mounted on the inner wall of the side panel 22 where the conveying implements 18 of the separating rotors 10 rotate downwardly. Thus, the transfer zone 50 does not include guide rails 26 when the separating rotors rotate in the direction shown by the arrows in FIG. 3. At such positions when the conveying implements 18 are conveying the harvested crop downwardly, gravity draws the harvested crop downwardly. No difficulties arise in regard to the catching and forwarding of the harvested crop by the conveying implements 18 arranged on the separating rotors 10.

The region between the rotational axes of the separating rotors 10 and the feed drum 8 at the base of the transfer zone 50 are arranged to ensure that the harvested crop is transferred properly with only minimal amount of upward and downward scatter. At this height, the pickup zone 24 is made wide enough as to enable the harvested crop to be collected. The guide rails 26 should not interfere with the path of the harvested crop when suspended from above.

A dividing wedge 28, which is removably mounted, is located after the feed drum 8 and prior to the side panels 22. The dividing wedge 28 is approximately flush with the side panels 22. Lateral flanks 29 of the dividing wedge 28 partially extend the surfaces of the side panels 22 and the lateral flanks 29 come together at a wedge edge 31. The wedge edge 31 is matched in part to the envelope of the feed drum 8 and extends to approximately the height of the rotational axes of the separating rotors 10, precede the two centrally located side panels 22. The dividing wedge 28 design permits the feed drum 8 to be positioned very closely to the conveying implements 18, thus resulting in a particularly good space-saving arrangement and improved flow of the harvested crop. The harvested crop flow is divided into two streams by the dividing wedge 28 working in conjunction with the feed drum 8. The harvested crop glides over the dividing wedge 28 toward the rotor housings 12. Long stemmed materials, such as stalks, contact the separating rotors 10 and are drawn into the corresponding rotor housings 12 via the dividing wedge 28. In the preferred embodiment, the dividing wedge 28 has a rounded upper surface to prevent the harvested crop from being cut or damaged.

In the preferred embodiment, a distance between the feed drum 8 and the dividing wedge 28 above the adjacent base plate 30. The smaller the distance between the dividing wedge 28 and the feed drum 8, the more effective the transfer and division of the crop stream in the vicinity of the dividing wedge 28. On the other hand, the distance between the feed drum 8 and the conveying implements 18 should not be too large as valuable space is lost and the harvested crop flow could be disturbed. Insofar as the dividing wedge 28 is raised between the feed drum 8 and the conveying implements 18, a certain amount of play must be left relative to the feed drum 8 so that the straw can be distributed via the dividing wedge 28 into the rotor housings 12. However, the degree of play should not be more than twice the highest elevation of the dividing wedge 28.

Figure 5:
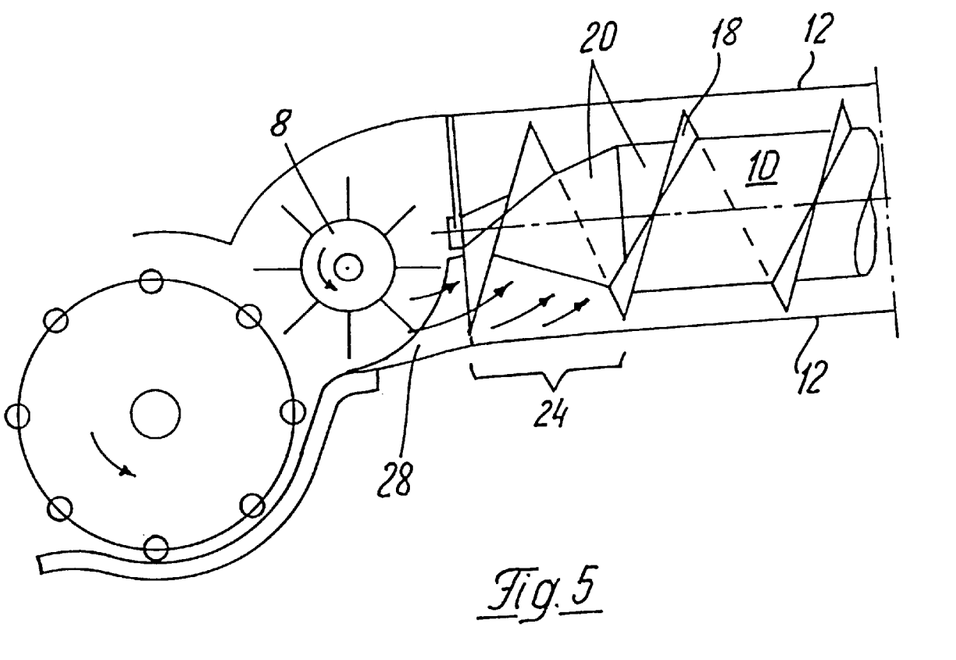
FIG. 5 is a side view of the transfer zone.

Referring now to FIG. 4, which illustrates the side panel 22 located approximately between the dotted lines. A base plate 30 has a triangular, flat surface, which may also be trapezoidal shaped and is located after the feed drum 8 and before the separation rotors 10. The base plate 30 tapers from wide to narrow away from feed drum 8. The side panels 22 and the base plate 30 are connected together by a transition surfaces 32, which are curved upwardly or angled at the sides and become wider towards the rear or towards the separating rotors 10. Seams 34 extend toward the cross-section of the rotor housings 12. A longitudinally extending feed zone can be formed if the base plate 30 passes under the feed drum 8 and extends to the frontal edge of the rotor housing 12. Referring now to FIG. 5, which illustrates how the harvested crop is laterally conveyed from the feed drum 8 to the pickup zone 24. The harvested crop is then moved from the pickup zone 24 by the separating rotors 10 so that the movement is converted into a radial movement. The relative height of the feed drum 8 relative to the height of the separating rotors 10 is apparent. The harvested crop is preferably forwarded into the capacious regions of the pickup zone 24 between the rotational axes of the separating rotors 10 and the base plate 30.

What is claimed is:

1. A self-propelled combine harvester comprising;
   at least one feed drum for receiving a harvested crop and for moving the harvested crop to at least one separating rotor, which is rotatably mounted in at least one rotor housing having a frontal edge;
   at least one drive mechanism for driving the at least one feed drum and the at least one separating rotor;
   the at least one separating rotor including a rotor core having a diverging end portion that tapers from narrow to wide in a direction away from the at least one feed drum;
   the at least one separating rotor including a helical conveyor having a generally uniform outer diameter extending substantially the length of the rotor core;
   a pickup zone having an inlet side and an outlet side, the inlet side being closer to the feed drum, the pickup zone including a side panel located between the feed drum and rotor housing, wherein the side panel converges from a generally rectangular inlet on the inlet side of the pickup zone to a generally semicircular outlet substantially equal to the rotor housing on the outlet side thereby forming a converging pickup zone; and
   wherein the diverging end portion of the rotor core is located in the converging pickup zone to facilitate the transfer of harvested crop to the rotor housing.

2. The self-propelled combine harvester according to claim 1, further including:
   at least one guide rail operatively mounted on an inner surface of the side panel; and
   wherein the at least one guide rail is directed upwardly at a steep angle and have slender tips and are increasingly elevated away therefrom.

3. The self-propelled combine harvester according to claim 1, wherein the at least one feed drum is at a height such that the harvested crop is fed substantially vertically along rotational axes of the at least one separating rotor from the feed drum.

4. The self-propelled combine harvester according to claim 1, further including:
   a transition surface located between the side panel and a base plate;
   a seam located between the base plate and the transition surface;
   wherein the base plate is operatively connected to the side panel forming a triangular or trapezoidal shape; and
   wherein the base plate is located between the at least one feed drum and the at least one separation rotor and the base plate narrows moving away from the at least one feed drum.

5. The self-propelled combine harvester according to claim 2, further including:
   a transition surface located between the side panel and a base plate;
   a seam located between the base plate and the transition surface;
   wherein the base plate is operatively connected to the side panel forming a triangular or trapezoidal shape; and
   wherein the base plate is located between the at least one feed drum and the at least one separation rotor and the base plate narrows moving away from the at least one feed drum.

6. The self-propelled combine harvester according to claim 4, wherein the base plate and the transition surface commence below the at least one feed drum and extend to the frontal edge of the at least one rotor housing.

7. The self-propelled combine harvester according to claim 5, wherein the base plate and the transition surface commence below the at least one feed drum and extend to the frontal edge of the at least one rotor housing.

8. The self-propelled combine harvester according to claim 1, in which the conveyor sweeps approximately one half the pickup zone.

9. A self-propelled combine harvester comprising;
   a feed drum for receiving a harvested crop and for moving the harvested crop to a plurality of separating rotors each rotatably mounted in a rotor housing; each rotor housing having a frontal edge;
   a drive mechanism for driving the feed drum and the separating rotors;
   each separating rotor including a rotor core having a diverging end portion that tapers from narrow to wide in a direction away from the at least one feed drum;
   each separating rotor including a helical conveyor having a generally uniform outer diameter extending substantially the length of the rotor core;
   a pickup zone having an inlet side and an outlet side, the inlet side being closer to the feed drum, the pickup zone including a plurality of side panels located between the feed drum and the rotor housings, each side panel corresponding to one of the rotor housings, wherein the side panels in combination form a generally rectangular inlet substantially equal to the feed drum on the inlet side of the pickup zone and converge such that each side panel is substantially equal to the rotor housing on the outlet side of the pickup zone thereby forming a converging pickup zone; and
   wherein the diverging end portion of the rotor core is located in the converging pickup zone to facilitate the transfer of harvested crop to the rotor housing.

10. The self-propelled combine harvester according to claim 9, further including:
    at least one guide rail operatively mounted on an inner surface of each side panel; and
    wherein the at least one guide rail is directed upwardly at a steep angle and have slender tips and are increasingly elevated away therefrom.

11. The self-propelled combine harvester according to claim 9, further including a dividing wedge located after the feed drum and prior to the side panels.

12. The self-propelled combine harvester according to claim 11, wherein the dividing wedge extends from a base plate to a height approximate to a height of a rotational axis of the separating rotors and wherein the dividing wedge is approximately level with the side panels.

13. The self-propelled combine harvester according to claim 11, in which a distance between the feed drum and the conveyors is a maximum of three times the height of the dividing wedge.

14. The self-propelled combine harvester according to claim 11, further including:
    a transition surface located between the side panels and the base plate;
    a seam located between the base plate and the transition surface;
    wherein the base plate is operatively connected to the side panels forming a triangular or trapezoidal shape; and
    wherein the base plate is located between the at least one feed drum and the at least one separation rotor and the base plate narrows moving away from the at least one feed drum.

15. The self-propelled combine harvester according to claim 10, further including:
    a transition surface located between the side panels and a base plate;
    a seam located between the base plate and the transition surface;
    wherein the base plate is operatively connected to the side panels forming a triangular or trapezoidal shape; and
    wherein the base plate is located between the feed drum and the separating rotors and the base plate narrows moving away from the feed drum.

16. The self-propelled combine harvester according to claim 14, wherein the base plate and the transition surface commence below the feed drum and extend to the frontal edge of the rotor housing.

17. The self-propelled combine harvester according to claim 15, wherein the base plate and the transition surface commence below the feed drum and extend to the frontal edge of the rotor housing.

18. The self-propelled combine harvester according to claim 9, further comprising:
    a plurality of guide rails operatively mounted on an inner surface of each side panel for positively influencing the harvested crop; and
    a dividing wedge removably mounted to the side panels for dividing the harvested crop into two streams.

19. The self-propelled combine harvester according to claim 18, further including:
    a transition surface located between the side panels and the base plate;
    a seam located between the base plate and the transition surface;
    wherein the base plate is operatively connected to the side panels forming a triangular or trapezoidal shape; and wherein the base plate is located between the at least one feed drum and the at least one separation rotor and the base plate narrows moving away from the at least one feed drum.

20. The self-propelled combine harvester according to claim 19, wherein the base plate and the transition surface commence below the feed drum and extend to the frontal edge of the rotor housing.

21. The self-propelled combine harvester according to claim 9, in which an end portion of each conveyor has a diameter that varies in proportion to the corresponding diverging end portion of the rotor core such that as the rotor core diameter decreases the diameter of the end portion of the conveyor increases.

22. The self-propelled combine harvester according to claim 9, in which the conveyors sweep approximately one half the pickup zone.

* * * * *